United States Patent
Willix

(10) Patent No.: US 9,894,977 B2
(45) Date of Patent: Feb. 20, 2018

(54) PET NAIL FILING DEVICE

(71) Applicant: Bill Willix, Boonton, NJ (US)

(72) Inventor: Bill Willix, Boonton, NJ (US)

(*) Notice: Subject to any disclaimer, the term of this patent is extended or adjusted under 35 U.S.C. 154(b) by 99 days.

(21) Appl. No.: 14/590,079

(22) Filed: Jan. 6, 2015

(65) Prior Publication Data

US 2016/0192758 A1  Jul. 7, 2016

(51) Int. Cl.
*A01K 13/00*  (2006.01)
*A45D 29/05*  (2006.01)

(52) U.S. Cl.
CPC .............. *A45D 29/05* (2013.01); *A01K 13/00* (2013.01)

(58) Field of Classification Search
CPC ........ A01K 31/12; A01K 31/00; A01M 29/16
USPC ............... 119/903, 531, 610; 340/573.1, 666
See application file for complete search history.

(56) References Cited

U.S. PATENT DOCUMENTS

| | | | | |
|---|---|---|---|---|
| 2,076,734 A * | 4/1937 | Leindorf | ................ | A01K 31/12 119/468 |
| 2,570,663 A * | 10/1951 | Guarino | ................ | A01K 31/12 119/468 |
| 3,754,556 A * | 8/1973 | Watkins | ................ | A45D 29/05 132/73.6 |
| 4,038,639 A * | 7/1977 | Kuebler | ................ | A01M 29/16 116/22 A |
| 6,332,431 B1 * | 12/2001 | Brown | ................ | A01K 13/00 119/468 |
| 7,428,881 B2 * | 9/2008 | Drelinger | ................ | A01K 13/00 119/608 |
| 8,469,039 B2 * | 6/2013 | Jackson | ................ | A01K 13/00 132/200 |
| 9,289,872 B1 * | 3/2016 | Altamirano | ................ | B24B 9/06 |

* cited by examiner

*Primary Examiner* — Peter M Poon
*Assistant Examiner* — Jeffrey R Larsen
(74) *Attorney, Agent, or Firm* — Gloria Tsui-Yip; Wendi E. Uzar

(57) ABSTRACT

A filing device that allows an animal to have its nails trimmed without human interaction or interference. The filing device includes a casing, a rod, a wall, housing, cap, motor, motor cover and power source. The rod is concentrically nested within the casing and covered in a grit material. The casing has a cutout on its bottom or top surface that allows the rod to be exposed. The rod is powered by a motor and when the power is turned on it causes the rod to rotate. An animal may mount itself on the casing of the filing device. When the motor is turned on it vibrates the device which causes the quick within the animal's vein to retract. As the animal sits on the casing its nails are exposed to the rotating rod which causes the nails to be filed.

9 Claims, 9 Drawing Sheets

PET NAIL FILING DEVICE

FIELD OF THE INVENTION

The invention relates to a device for grooming pets. In particular, an improved device that automatically and safely trims and/or files a pet's nails while the animal is standing on the device. The device causes the vein inside the nail, known as the quick, to recede in the nail and therefore allows for the animal's nails to be trimmed safely. The device further provides use without the assistance of or interference from a human or owner of the pet.

BACKGROUND OF THE INVENTION

Grooming devices are commonly used to trim a pet's nails. Generally a pair of scissors or nail clippers are used to trim an animal's nails or claws. Scissors and nail clippers have serious set backs including the potential of causing serious pain and injury to the pet if the claws are clipped too much. Each animal has a vein in each of its nails, known as the quick. Depending on the animal, including the breed and type of animal, the quick extends for a certain distance in the nail. If a user is not careful and experienced, they can cut the quick of the animal during grooming. This causes extreme pain and bleeding to the animal. Additional drawbacks of scissors and clippers include the animal seeing the device during the grooming process and resisting the process. This can make it extremely difficult to restrain the pet in order to cut its nails. Scissors and nails can also fail if the pet's nails are very thick or cause the animal's nails to become jagged.

Additional devices are known in the art to cut an animal's nails such as electric handheld rotary filing devices. These devices, such as a Dremel® rotary tool, grind an animal's nails while the user holds the tool and the animals' nail must be held abutting the device. The rotary filing devices have numerous drawbacks including the fact that it is difficult to hold the animal's nail to the filing device, especially when the animal is scared of the device or its sound. Further, these devices do not address the fact that the speed and direction of the filing device should be adjusted in accordance with the type, breed and size of the animal.

Therefore, there is a need for a nail filing device that automatically, effectively and safely trims an animal's nails without the owner's assistance.

SUMMARY OF THE INVENTION

The present invention is a stationary filing device for safely trimming a pet's nails while the animal is standing or mounts the device without human intervention. The device is configured to cause motion which causes the vein inside the nail, known as the quick, to recede in the nail which allows for the animal's nails to be trimmed safely.

The device for filing an animal's nails comprises at least one rod, each rod having a grit material on at least a portion of its surface, a casing having a first end, a second end, a top, a bottom, and at least one cutout on said casing, said casing is sized to partially cover and nest said rod therein, a motor connected to and rotates the rod within the casing which remains fixed, the rotation of the rod causing the casing to vibrate, and a power source, connected to and provides power to the motor, wherein an animal's nail is adapted to abut the rotatable rod to be filed when it is standing on said casing without human interaction.

The grit material can be sand paper and preferably the rod has a circular cross section. In one embodiment the cutout of the casing allows the bottom portion of the rod to be exposed when the rod is concentrically nested within the casing. The rod has a first end and a second end. The first end of the rod has a first bushing. The second end of the rod has a second bushing. It is contemplated that the cap contains an attachment member that is sized or shaped to mate with the first bushing of the rod.

The speed that the rod rotates is specifically set based upon the type and breed of animal using the device. For a bird, the speed is set to 10 revolutions per minute. If the device is used for a hamster, guinea pig or other small rodents the speed will be slightly higher as the nails of those animals are harder and the speed would be set to 12 or 14 revolutions per minute.

When the filing device is turned on the rod rotates which causes the casing to vibrate. When a bird, or other animal, stands on the filing device their claws wrap around the casing with the ends of their nails lining up with the casing cutout and exposing the animal's nails to the rod. The vibration of the casing has been found to be pleasurable to the animal which encourages the animal to remain on the casing. The vibration also causes the quick, or vein in the animal's nails, to retract. The refraction of the quick provides a huge advantage in that it allows the animal's nails to be filed without risking harm to the animal. As the rod turns, the grit material or sand paper comes in contact with the animal's nails and files them. In most instances the animal may even be unaware that the filing is taking place.

In one embodiment of the present invention the filing device further comprises a sensor which allows the filing device to be turned on and off depending on whether an animal is mounted on the casing. The sensor may be a motion detection sensor, a proximity sensor, a pressure sensor or other sensors known to one skilled in the art. Without a sensor, the device may be switched on and off at the pet owner's option via a manual or remote switch known to one skilled in the art.

BRIEF DESCRIPTION OF THE DRAWINGS

A preferred embodiment of the present invention has been chosen for purposes of illustration and description and is shown in the accompanying drawings forming a part of the specification wherein.

DETAILED DESCRIPTION OF THE PREFERRED EMBODIMENTS

Figure 1:
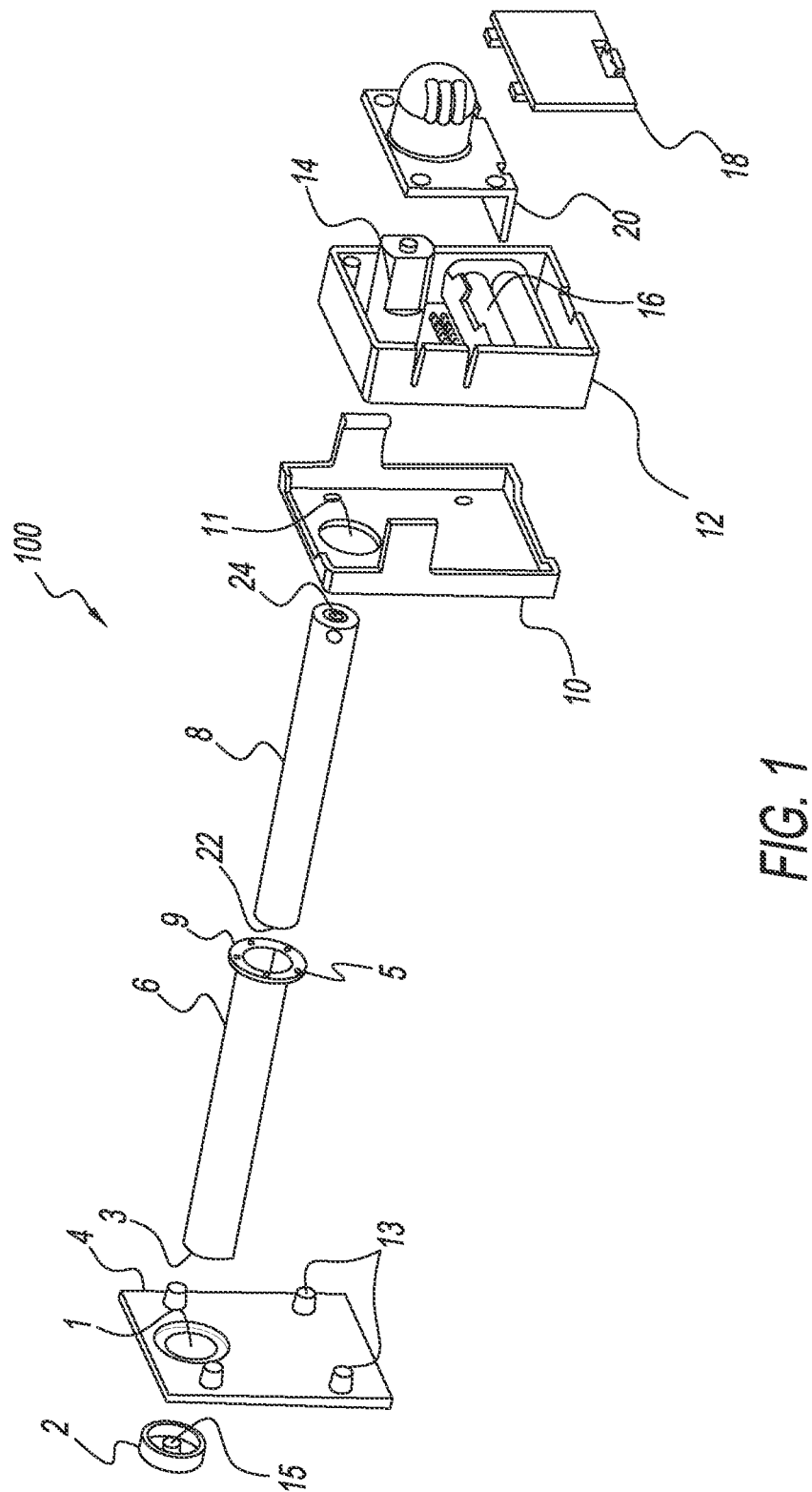
FIG. 1 is an exploded view of a first embodiment of the filing device of the present invention.

With reference to the drawings, wherein the same reference number indicates the same element throughout, there is shown in FIG. 1 an exploded view of a filing device 100 of the present invention. As shown in FIG. 1, the filing device 100 includes a cap 2, wall cover 4, casing 6, rod 8, wall 10, housing 12, motor 14, motor cover 20, power source 16 and power source cover 18.

As shown in FIG. 1, tubular casing 6 has a first end 3, a second end 5, a top, and a bottom. The wall cover 4 has an aperture 1 sized to accept the casing 6 therethrough. In the preferred embodiment the casing 6 and the aperture 1 have circular cross sections. The wall cover 4 has at least one tab 13 that extends out from the wall cover 4.

Figure 2:
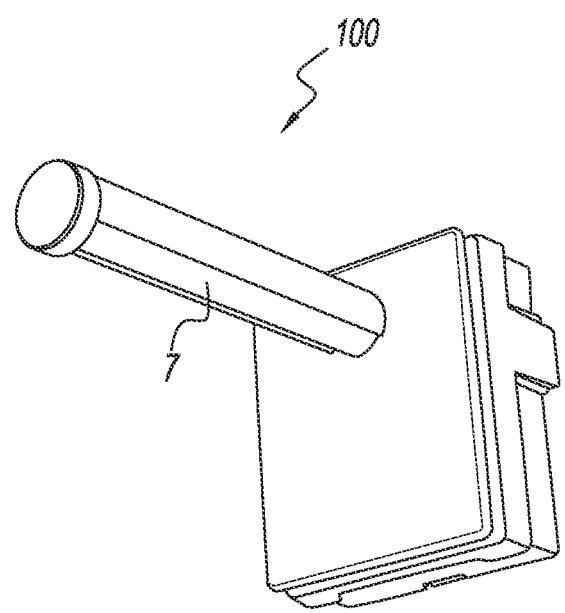
FIG. 2 is a perspective view of the assembled first embodiment of the present invention.

The first end 3 of the casing 6 is sized to extend through the aperture 1 of the wall cover 4 and frictionally accept the cap 2 thereon when the filing device 100 is assembled. The second end 5 of the casing 6 has an enlarged flange 9 extending therefrom. The casing 6 has a cutout 7 (as shown in FIG. 2) on the bottom surface. The casing 6 is internally sized to cooperatively mate with and concentrically nest the rod 8 therein.

The rod 8 is preferably covered with a grit material such as sand paper and has a circular cross section. The cutout 7 of the casing allows the bottom portion of the rod 8 to be exposed when the rod is concentrically nested within the casing 6. The rod 8 has a first end and a second end. The first end of the rod 8 has a first bushing 22. The second end of the rod 8 has a second bushing 24. It is contemplated that the cap 2 contains an attachment member 15 that is sized or shaped to mate with the first bushing 22 of the rod 8.

The wall 10 has an aperture 11 sized to accept the second end of the rod 8 therein. The flange 9 of the casing 6 abuts the wall 10 and surrounds the aperture 11 when the casing 6 is affixed to the wall 10. Screws, nails or other fastening devices known in the art may be used to affix the flange 9 to the wall 10.

As shown in FIG. 1, the housing 12 has an interior area and holds the motor 14 and power source 16. A motor cover 20 is affixed to the housing 12 to enclose the motor. A power source cover 18 is affixed to the housing 12 to enclose the power source. In the present embodiment of the present invention the power source 16 is one or more batteries. The power source 16 is connected to and provides power to the motor 14. The motor 14 is connected to and is capable of rotating the rod 8 within the casing 6 which remains stable. The rotation of the rod 8 causes the casing 6 to vibrate.

Figure 3:
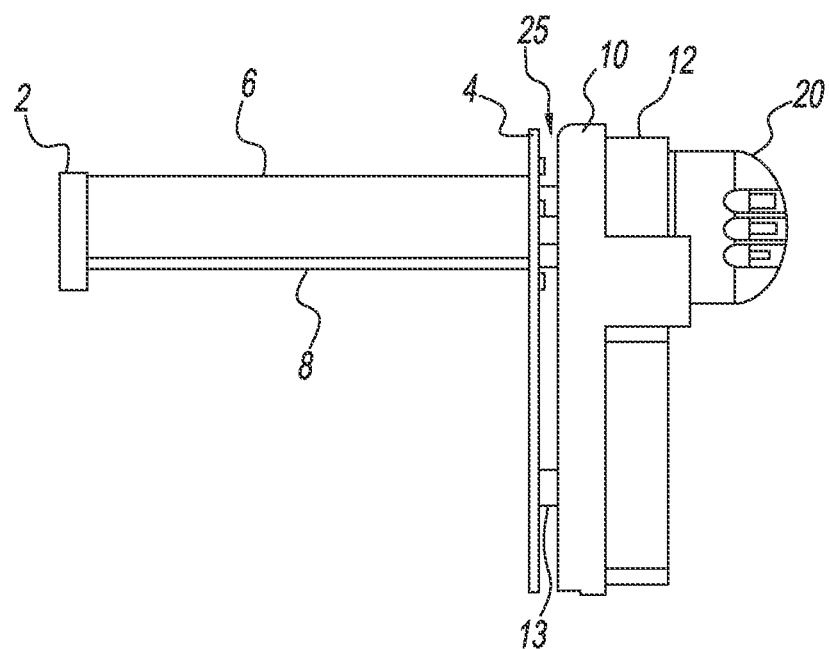
FIG. 3 is a side view of the present invention.
Figure 4:
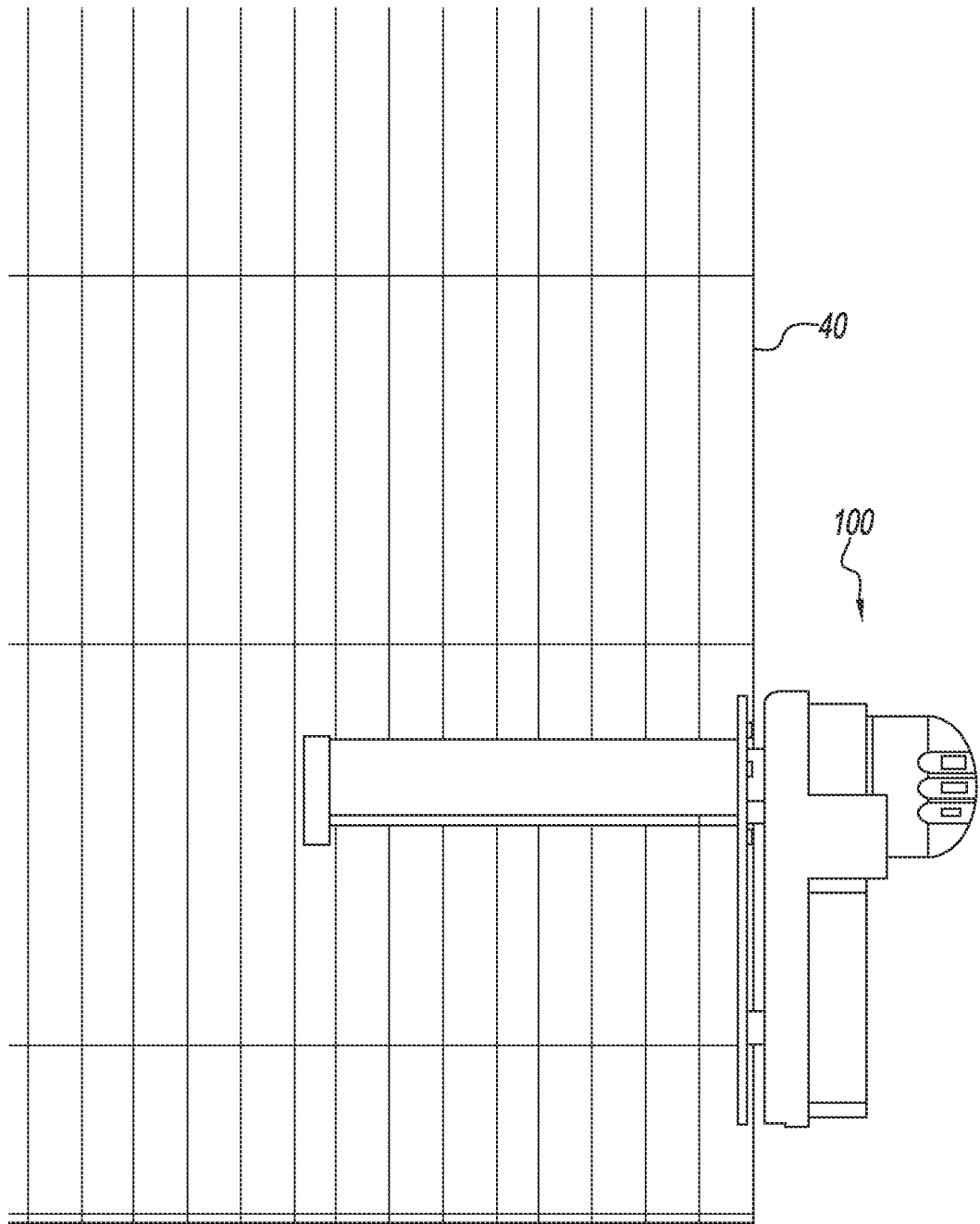
FIG. 4 is a side view of the present invention installed in a cage.

The wall 10 affixes to the housing 12 by a snap fit. As shown in FIG. 3, when the wall 10 is affixed to the housing 12 the two or more tabs 13 of the wall 10 create an gap 25 between the wall cover 4 and the wall 10. As shown in FIG. 4, the filing device 100 is to be attached to a bird cage or other animal cage 40. The gap 25 in coordination with tabs may be utilized for installation and encasement of the frame of the cage therein allowing the casing 6 and wall cover 4 to be within the cage 40 while the wall 10 and housing 12 are outside of the cage 40.

The speed that the rod 8 rotates is specifically set based upon the type and breed of animal using the device. For a bird, the speed is set to 10 revolutions per minute. If the device is used for a hamster, guinea pig or other small rodents the speed will be slightly higher as the nails of those animals are harder and the speed would be set to 12 or 14 revolutions per minute.

As described above, when the filing device 100 is turned on the rod 8 rotates which causes the casing 6 to vibrate. When a bird, or other animal, stands on the filing device 100 their claws wrap around the casing 6 with the ends of their nails lining up with the casing cutout 7 and exposing the animal's nails to the rod 8. The vibration of the casing 6 has been found to be pleasurable to the animal which encourages the animal to stand on the casing 6. The vibration also causes the quick, or vein in the animal's nails, to retract. The refraction of the quick provides a huge advantage in that it will allow the animal's nails to be filed without risking harm to the animal. As the rod 8 turns, the grit material or sand paper comes in contact with the animal's nails and files them. In most instances the animal may even be unaware that the filing is taking place.

Figure 5:
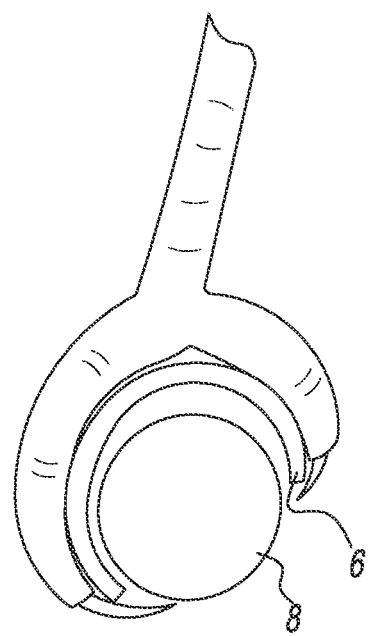
FIG. 5 is a cross sectional view of the perch of the present invention with a bird standing on the perch.

Once installed in the cage 40 of an animal, such as a bird, the filing device 100 of the present invention becomes apart of the animals habitat. In a bird cage, for example the filing device also serves as a perch. As shown in FIG. 5, an animal, such as a bird mounts itself on the filing device 100 with no aid of a human. Once mounted on the filing device 100, a bird's nails wrap around the device 100 and are exposed to the rod 8. When the device 100 on the rod 8 rotates, the rotating grit files the nails of the animal.

Although FIG. 4 shows a birdcage, it can be installed in cages for other types of animals and in which case the device 100 may be positioned towards the floor board of the cage. It may also be incorporated as part of the floorboard.

In one embodiment of the present invention the filing device 100 further comprises a sensor which allows the filing device 100 to be turned on when an animal mounts itself on the casing 6. The sensor may be a motion detection sensor, a proximity sensor, a pressure sensor or other sensors known to one skilled in the art. Without a sensor, the device 100 may be switched on and off at the pet owner's option via a manual or remote switch known to one skilled in the art (not shown).

The grit or sandpaper is affixed to rod 8 using methods known to one skilled in the art such as adhesive, Velcro, etc. The sandpaper can be removed and replaced by un-affixing it from the rod 8 and affixing a new piece of sandpaper. It is also contemplated that the entire rod 8 made having grit or sandpaper affixed thereto may be replaced from the device and the old rod discarded. Rods 8 may have different grit size depending on the type and size of the animal and its nails.

Casing 6 may be made of a non-slip material or covered with a non-slip material. To improve the comfort of the animal standing on the casing 6, it may be cushioned such as using a silicone, neoprene or rubber material.

Figure 6:
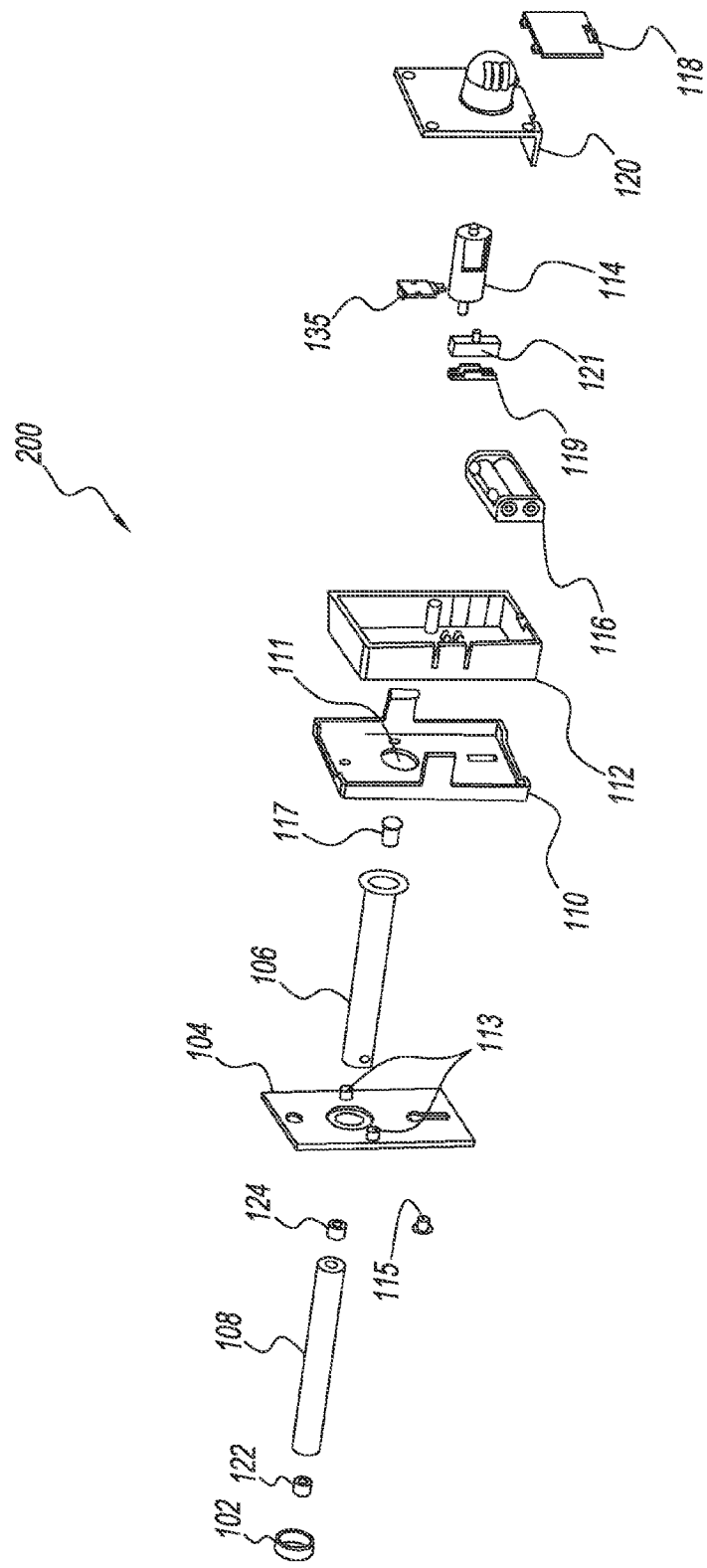
FIG. 6 is an exploded view of a second embodiment of the filing device of the present invention.

FIG. 6 shows a second embodiment of the filing device 200 of the present invention. As shown in FIG. 6, the filing device 200 is similar to the filing device 100 in that the housing 112 has an interior area and holds the motor 114 and power source 116. A motor cover 120 is affixed to the housing 112 to enclose the motor 114. A power source cover 118 is affixed to the housing 112 to enclose the power source 116. The power source 116 is one or more batteries. The power source 116 is connected to and provides power to the motor 114. The motor 114 is connected to and is capable of rotating the rod 108 within the casing 106 which remains stable. The rotation of the rod 108 causes the casing 106 to vibrate.

The filing device 200 also contains switch holder 119 and on/off switch 121 which is connected to and capable of controlling the power source 116. The filing device 200 also includes a motion sensor PCB module 135 which is capable of controlling power to the device 200 based on motion of an animal. The motion sensor 135 is located within the main housing 112 and controls the motor 114. The sensor 135 works to turn the device 200 on when an animal steps on or puts pressure on the perch 106. The filing device 200 further comprises at least one cage assembly floating pin 115 to aid in the installation of the device to an animal cage 40. The remaining components of the filing device 200 are akin to those of the filing device 100 as shown in FIGS. 1-5.

Figure 7:
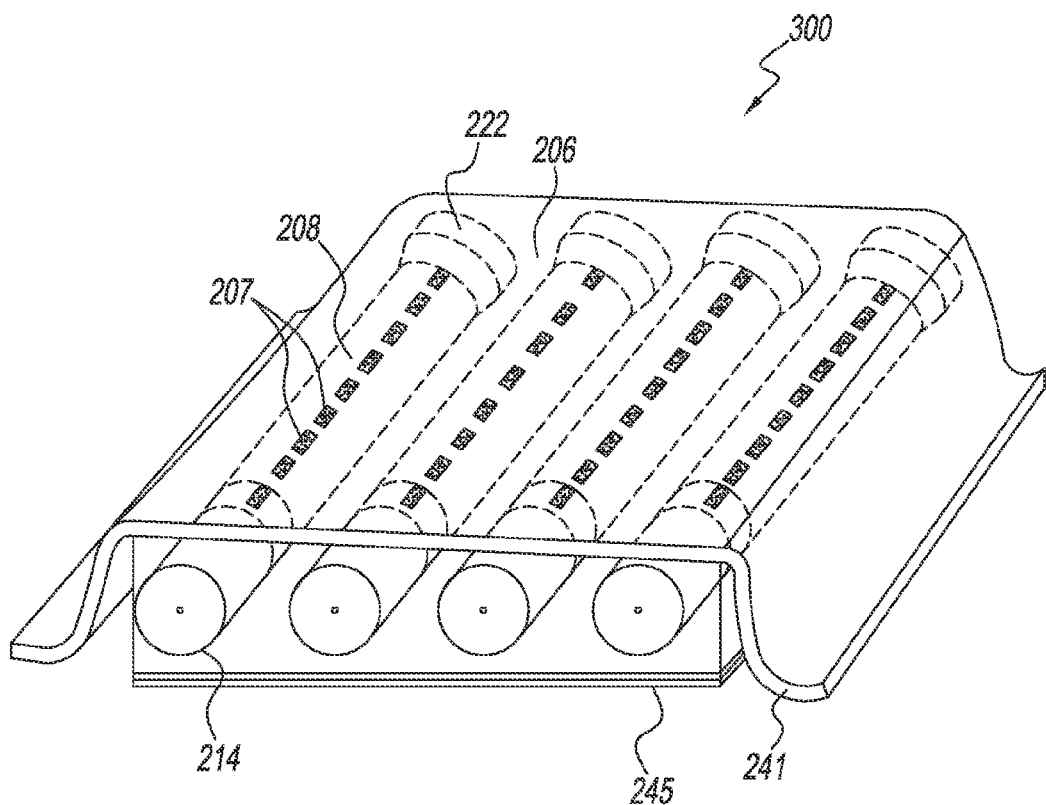
FIG. 7 is a perspective view of a third embodiment of the filing device of the present invention.
Figure 8:
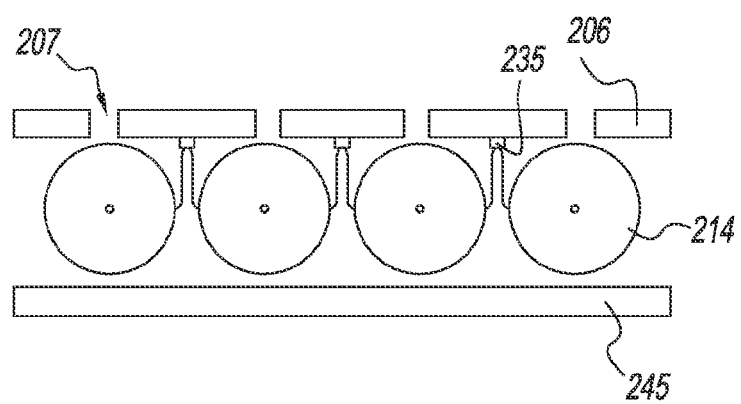
FIG. 8 is a side view of the third embodiment of the filing device of the present invention.

FIG. 7 shows another embodiment of the present invention as it relates to a rug nail filing device 300. As shown in FIG. 7, casing 206 covers the entire nail filing device 300 which comprises a plurality of rods 208 that are arranged to be parallel to one another. The rods 208 have a first end and a second end. The first end of the rod 208 is connected to a motor 214. The motor 214 is connected to a power source 216 (not shown). The power source 216 provides power to the motor 214. The motor 214 is connected to the rod 208. Therefore, when the motor 214 is provided with power, it causes the rod 208 to rotate. The rod 208 is either made from or covered in a grit material or sand paper. The second end of the rod 208 is connected to a bushing 222.

The casing 206 has a plurality of cutouts 207 that allow access from above the casing 206 to the rods 208. The cutouts 207 are designed and sized to accept the nails or claws of animals such as dogs, cats, rabbits, etc. When an animal stands on the rug device 300 its nails extend through the cutouts 207 and are put in contact with the rods 208 which causes the animal's nails to be trimmed.

Figure 9:
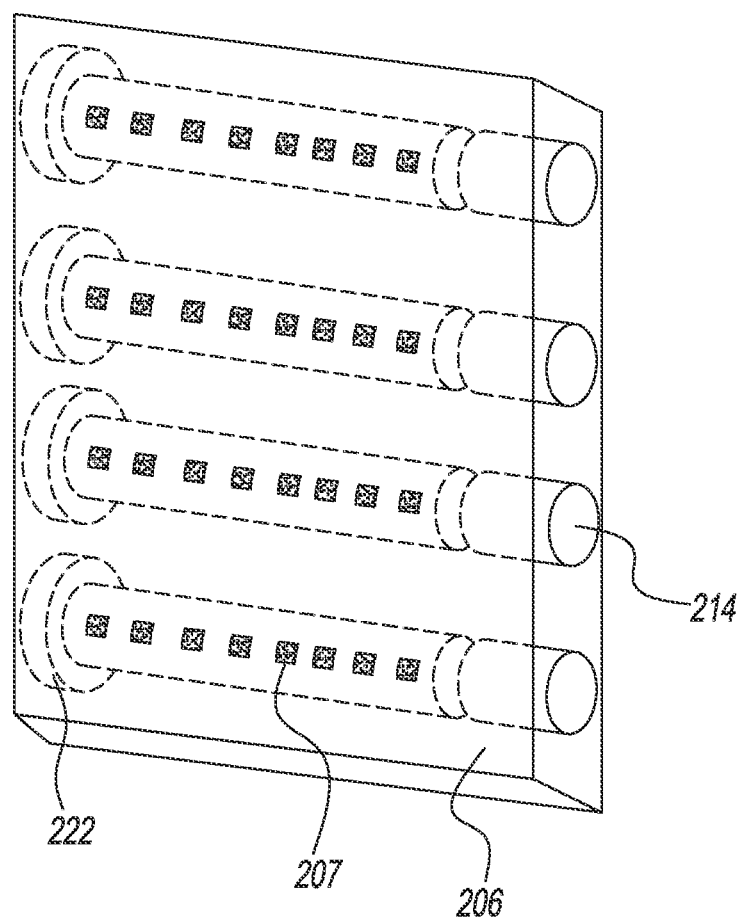
FIG. 9 is a top perspective view of the third embodiment of the filing device of the present invention.
Figure 10:
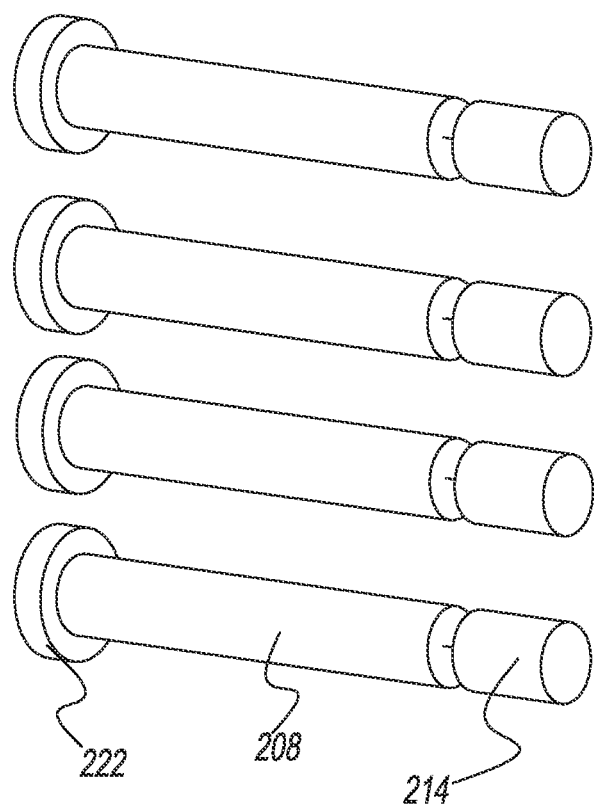
FIG. 10 is a top perspective view of the third embodiment of the filing device of the present invention with the cover removed.

In one embodiment of the present invention a sensor 235 is utilized in cooperation with the casing 206 between the rods 208 and installed under, above or near the casing 206. The sensor 235 allows the device 300 to be powered on from the movement, weight or pressure of an animal. It is contemplated that the rug device 300 further comprises a tray 245 that is located below the rods 208 or sits on the ground to catch the debris that results from the trimming of the animal's nails or claws. The casing 206 further comprises two ends 241 extending from the casing from the top of the device 300 to cover the motors 214, rods 208 and bushings 222. The casing 206 and the two ends 241 can be made of or covered with a soft material such as rubber, silicone or neoprene. FIG. 9 shows a top view of the rug device 300. FIG. 10 shows the assembly of rods 208, the motors 2014 and the bushings 222 with the casing removed. It is contemplated that the rug device 300 of the present invention be used as a stand alone unit and placed in front of the animal's food to entice them to stand on it without human interaction or interference and have their nails trimmed. It is also contemplated that the rug device 300 be incorporated into other products such as an animal or pet carry or travel bag. The rug device 300 can be placed at a location where it is leveled and flushed against a floorboard.

All the filing devices of the present invention, including filing devices 100, 200, and 300, are the same product doing the same job (causes the quick of an animal to retreat), but in different shapes to fit or accommodate different pets.

The features of the invention illustrated and described herein are the preferred embodiments. Therefore, it is understood that the appended claims are intended to cover unforeseeable embodiments with insubstantial differences that are within the spirit of the claims.

What I claim is:

1. A free-standing device to be placed on a flat surface for filing an animal's nails having a quick without human intervention comprising:
    a) a plurality of cylindrical rods each having a first end, a second end and a curved surface extending from said first end to said second end, said rods being arranged to be parallel to one another, each rod having a grit material on at least a portion of said curved surface,
    b) a fixedly positioned casing having a first end, a second end, a top, a bottom, and a plurality of cutouts on the top of said casing, the top of said casing is flat and positioned over said plurality of rods and sized to cover said plurality of rods and nest said plurality of rods therein, the bottom of said casing being flat and positioned directly below said plurality of rods and shaped to rest on the flat surface,
    c) a motor connected to and rotates each rod simultaneously within the casing, said motor rotates the plurality of rods at a pre-determined speed to cause the casing to vibrate, and
    d) a power source, connected to and provides power to the motor,
    wherein an animal is adapted to mount the top of said fixedly positioned casing anywhere between said first end to said second end of said casing without human intervention while all the animal's nails are adapted to abut the plurality of rotatable rods through the plurality of cutouts on the top of said casing and wherein the vibration of said casing causes the nails' quick to recede.

2. The device for filing an animal's nails of claim 1 wherein said cutouts are designed and sized to accept the nails of an animal therethrough when an animal is standing on said fixedly positioned casing and the nails are in contact with said curved surface of said plurality of rods.

3. The device for filing an animal's nails of claim 1 further comprising:
    a removable tray below the rods to catch debris that results from the trimming of the animal's nails.

4. The device for filing an animal's nails of claim 1 further comprising:
    a sensor attached to said casing that turns on said power source when an animal mounts itself on said casing.

5. The device of claim 1 wherein the rods rotate at a speed of 10-14 revolutions a minute to cause the quick of the animals' nails to recede.

6. A device for filing an animal's nail having a quick attached to a cage comprising:
    a) a rotating cylindrical rod with a first end, a second end, a first diameter and a curved surface extending from said first end to said second end having a grit material on at least a portion of said curved surface,
    b) an elongated casing fixedly positioned inside the cage having a first end, a second end, a second diameter, a top, a bottom, and a longitudinal cutout on said bottom of said casing extending substantially from said first end to said second end of said casing, said casing is internally sized to cooperatively mate with and concentrically nest said rod therein, wherein said first diameter of said rotating rod is smaller than said second diameter of said casing, said top of said casing having no openings to expose said rod and completely covers said rod from said first end to said second end of said rod, said cutout on said bottom of said casing exposes said rotating rod,
    c) a motor connected to and rotates the rod within the casing, said motor rotates the rod at a pre-determined speed to cause said casing to vibrate,
    d) a power source connected to and provides power to the motor,
    e) means for removably attaching the fixedly positioned casing to the cage,
    wherein an animal is adapted to mount the top of said fixedly positioned casing anywhere between said first end to said second end of said casing without human intervention while the animal's nail is adapted to abut the rotatable rod through the cutout on the bottom of said casing and wherein the vibration of said casing causes the nail's quick to recede and its nails to be filed when it is standing on said casing.

7. The device of claim 6 further comprising:
   a. a sensor connected to said motor that turns on said power source when an animal mounts itself on said stationary casing.

8. The device of claim 6 wherein the rod rotates at a speed of 10-14 revolutions a minute to cause the quick of the animals' nails to recede.

9. A method of filing an animal's nails having a quick without human intervention in a cage, comprising the steps of:
   a) providing at least one cylindrical rod having a first end, a second end, a first diameter, and a curved surface extending from said first end to said second end, each rod having a grit material on at least a portion of said curved surface,
   b) providing an elongated casing fixedly positioned inside the cage having a first end, a second end, a second diameter, a top, a bottom, and a longitudinal cutout on the bottom of said casing, extending substantially from said first end to said second end of said casing, the top of said casing having no openings to expose said rod and is sized to completely cover from said first end to said second end of said rod and concentrically nest said rod therein, wherein said first diameter of said rotating rod is smaller than said second diameter of said casing, said cutout on said bottom of said casing exposes said rotating rod,
   c) providing a motor connected to and rotates the rod within the casing, and
   d) providing a power source, connected to and provides power to the motor,
   e) an animal standing on the top of said casing without human intervention;
   f) said animal's nails are adapted to abut the rotatable rod through said cutout on the bottom of said casing and wherein the vibration of said casing causes the nail's quick to recede;
   g) rotating said motor at a predetermined speed to rotate the rod and cause the casing to vibrate; and
   h) filing said animal's nails with said grit material on said rod.

* * * * *